United States Patent

[11] 3,627,780

[72] Inventors: Lucien Bonnard; Pierre Grosjean, both of Lyon, France
[21] Appl. No. 707,283
[22] Filed Feb. 21, 1968
[45] Patented Dec. 14, 1971
[73] Assignee Societe Rhodiaceta, Paris, France
[32] Priority Feb. 28, 1967
[33] France
[31] 96,872

[54] BIS-MALEAMIC COMPOUNDS
7 Claims, No Drawings

[52] U.S. Cl. ........................... 260/326.3, 260/41 A, 260/78 UA
[51] Int. Cl. ........................... C07d 27/18
[50] Field of Search ........................... 260/326.3

[56] References Cited
UNITED STATES PATENTS

| | | | |
|---|---|---|---|
| 2,643,258 | 6/1953 | Miller et al. | 260/326.5 |
| 2,980,694 | 4/1961 | Sauers et al. | 260/326.5 |
| 2,989,504 | 6/1961 | Little | 260/62 |
| 3,337,584 | 8/1967 | Knock | 260/326.3 |
| 3,431,276 | 3/1969 | Nield | 260/326.5 |

Primary Examiner—Nicholas S. Rizzo
Assistant Examiner—Joseph A. Narcavage
Attorney—Cushman, Darby & Cushman ABSTRACT: New bis-imides of formula:

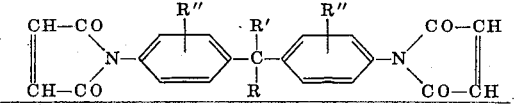

in which R is hydrogen, alkyl, cycloalkyl or aryl, R' is alkyl, cycloalkyl or aryl, or R and R' together form an alkylene group and R'' is hydrogen or lower alkyl, and made by dehydrating new acids of formula:

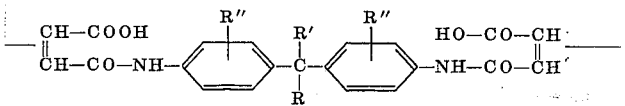

in which R, R' and R'' are as above.

The bis-imides can be formed into moulded cross-linked polymers by heating.

BIS-MALEAMIC COMPOUNDS

This invention relates to new bis-maleamic compounds, and to the imides and polymides made therefrom.

These new compounds have the formula

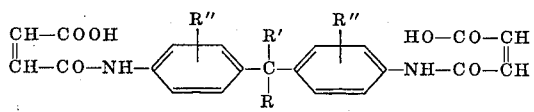

in which R is a hydrogen atom or alkyl, cycloalkyl or aryl radical, R' is an alkyl, cycloalkyl or aryl radical, or R and R' together form an alkylene radical, and R'' is a hydrogen atom or a lower alkyl radical (i.e. an alkyl radical containing one to four carbon atoms).

These compounds are yellow solids of high melting point. They are soluble in the cold in highly polar solvents such as dimethyl formamide and dimethyl acetamide. By reaction with organic or mineral bases, water-soluble salts are obtained. They possess the characteristic properties of compounds having double bonds, and the proximity of the amide and acid groups increases the reactivity of these double bonds.

The bis-maleamic compounds of the invention give, on dehydration by methods known per se, bis-imides of the formula:

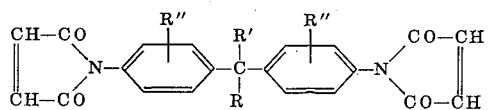

These bis-imides are yellow or yellowish solids whose melting points are of the same order as those of the corresponding maleamic acids. They are more soluble in polar solvents than are the acids.

They can be polymerized by the action of heat by the process described in French Patent, Specification No. 1,455,514. The resulting new polymers have valuable thermal properties, including good stability to prolonged heating at high temperature.

The bis-maleamic compounds of the invention can be prepared by the reaction of maleic anhydride with a diamine in accordance with the following reaction scheme:

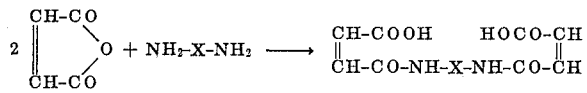

X being a divalent radical of formula

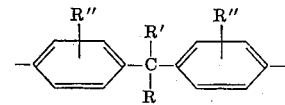

R, R' and R'' having the meanings already given.

The diamines which may be employed include diaminodiphenylalkanes such as 2,2-bis(p-aminophenyl)propane, 1-bis(aminophenyl)cycloalkanes such as 1,1-bis(p-aminophenyl)cyclohexane, and diaminotriphenylalkanes such as 1,1-bis(p-aminophenyl)-1-phenylethane.

The condensation can be carried out in a solvent medium preferably consisting of a mixture of dimethylformamide and acetone at a temperature below 20° C. The bis-maleamic compounds are obtained in the form of precipitates.

On heating these compounds to a temperature between 40° and 60° C. with acetic anhydride in the present of sodium acetate, preferably in a liquid medium such as dimethylformamide they are dehydrated to the corresponding bis-imides in accordance with the reaction:

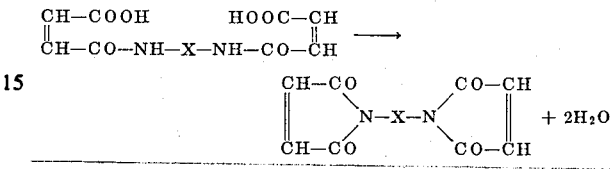

New three-dimensional (cross-linked) polyimides are obtained in the form of powder or of shaped objects by heating the aforesaid bis-imides at a temperature between 80° and 400° C. The bis-imides may be mixed with fillers, which will then become incorporated in the polymers.

The bis-maleamic compounds and the bis-imides of the invention may also be employed for cross-linking polymers such as polyethylene and polyoxymethylene.

The following example illustrate the invention.

EXAMPLE 1

3.3 mol of maleic anhydride is dissolved in 350 cc. of acetone, and the solution obtained is introduced into a 2-liter reactor provided with a stirrer and a thermometer, and placed in a cooling bath consisting of a mixture of water and ice.

1.5 mol of 1,1-bis(p-aminophenyl)cyclohexane in solution in 800 cc. of a solvent consisting of a mixture of dimethyl formamide and chloroform in equal volumes is slowly introduced into the reactor with vigorous stirring. The rate of flow is so adjusted that the temperature of the reaction mass remains below 20° C.

The bis-maleamic compound precipitates as it is formed and is recovered by filtration at the end of the reaction.

After washing with acetone and drying at 40° C. in vacuo, there is obtained 620 g. of a product of the formula:

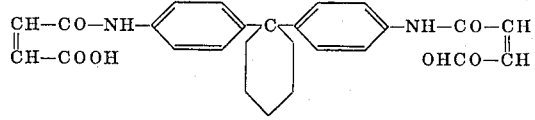

It has a melting point of 280° C.

EXAMPLES 2, 3, 4, 5 and 6

By the procedure of example 1, the products shown in the following table are prepared from the diamines indicated:

| Diamine | | Anhydride | | | Product obtained | | |
|---|---|---|---|---|---|---|---|
| Nature | Mol | Solvent, cc. | Mol | Solvent, cc. | Formula | | Weight, g. | M.P., °C. |
| H₂N–C₆H₄–C(CH₃)₂–C₆H₄–NH₂ | 1.54 | 800 | 3.3 | 350 | CH–CO–NH / CH=COOH ... NH–CO–CH / OHCO–CH (with C(CH₃)₂ bridge) | 620 | 220 |
| H₂N–C₆H₃(CH₃)–C(CH₃)₂–C₆H₃(CH₃)–NH₂ | 0.25 | 120 | 0.6 | 90 | corresponding bis(maleamic acid) with tolyl/C(CH₃)₂ bridge | 100 | 85 |
| H₂N–C₆H₃(CH₃)–C(cyclohexyl)(CH₃)–C₆H₄–NH₂ | 0.25 | 700 | 0.6 | 90 | corresponding bis(maleamic acid) | 120 | 204 |
| H₂N–C₆H₄–C(CH₃)(C₆H₅)–C₆H₄–NH₂ | 0.42 | 500 | 1.1 | 200 | corresponding bis(maleamic acid) | 200 | 266 |
| H₂N–C₆H₄–CH(C₆H₅)–C₆H₄–NH₂ | 1 | 900 | 2.1 | 350 | corresponding bis(maleamic acid) | 400 | 192 |

| Bis-maleamic compound | | Anhydride, Mol | Sodium acetate, weight | Solvent, cc. | Product obtained | | |
|---|---|---|---|---|---|---|---|
| Nature | Mol | | | | Formula | Weight | M.P., °C. |
| [p-CH₃-C(CH₃)₂-C₆H₄-C₆H₄-NH-CO-CH=CH-COOH]₂ | 0.1 | 0.3 | 2 | 10 | Bis-maleimide of 4,4'-(isopropylidene)dianiline | 20 | 227 |
| [3-CH₃-4-(p-CH₃-C(CH₃)₂-C₆H₄)-C₆H₃-NH-CO-CH=CH-COOH]₂ | 0.9 | 0.3 | 2 | 40 | Bis-maleimide (3,3'-dimethyl, 4,4'-isopropylidene dianiline) | 19 | 203 |
| [3-CH₃-4-(p-cyclohexylidene-C₆H₄)-C₆H₃-NH-CO-CH=CH-COOH]₂ | 0.1 | 0.3 | 2 | 45 | Bis-maleimide (3,3'-dimethyl-4,4'-cyclohexylidene dianiline) | 37 | 206 |
| [p-(C(CH₃)(C₆H₅)₂)-C₆H₄-NH-CO-CH=CH-COOH]₂ | 0.1 | 0.3 | 2 | 60 | Bis-maleimide of 4,4'-(1-methyl-1-phenyl methylene) dianiline | 35 | 239 |
| [p-(CH(C₆H₅)₂)-C₆H₄-NH-CO-CH=CH-COOH]₂ | 0.1 | 0.3 | 2 | 60 | Bis-maleimide of 4,4'-(phenyl methylene) dianiline | 27 | 221 |

EXAMPLE 7

Into a 1-liter glass reactor provides with a thermometer and a central stirring system and heated by a water bath are introduced:
- 0.5 mol of the compound obtained in example 1
- 1.5 mol of acetic anhydride
- 300 cc. of dimethyl formamide
- 10 g. of sodium acetate The temperature is gently raised to 60° C., and the reaction mass is maintained at this temperature for 1 hour. After cooling to 15° C., the excess of anhydride is destroyed by adding a little water, and the bis-imide of the formula:

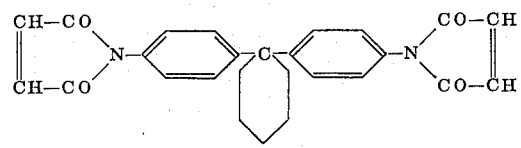

crystallizes out.

After filtration, 170 g. of the bis-imide is obtained, which after washing with water and drying in vacuo at 40° C. has a melting point of 213° C.

EXAMPLES 8, 9, 10, 11 and 12

By the procedure of example 7, the following bis-imides are prepared from the compounds obtained in examples 2, 3, 4, 5 and 6.

EXAMPLE 13

Ten grams of 1,1-bis(p-maleimidophenyl)cyclohexane prepared in example 7 is heated until it has completely melted. Six grams of powdered silica is added, and when this mixture has been degasified it is poured into a mould and heated at 200° C. for 3 days. An infusible and insoluble moulded article is obtained.

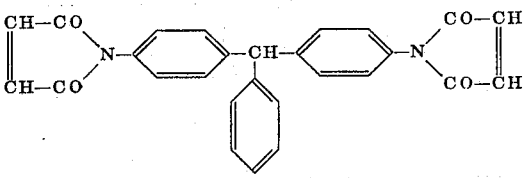

We claim:

1. A compound of the formula:

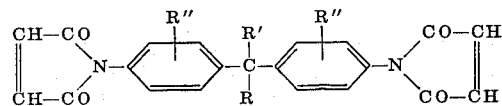

in which R″ is hydrogen or lower alkyl, and R and R′ together are pentamethylene or R′ is lower alkyl or phenyl and R is lower alkyl or phenyl, or hydrogen when R′ is phenyl.

2. A bis-imide of the formula:

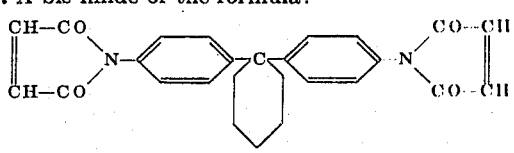

3. A bis-imide of the formula:

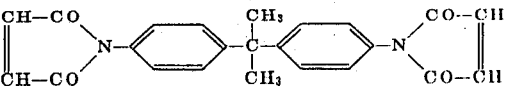

4. A bis-imide of the formula:

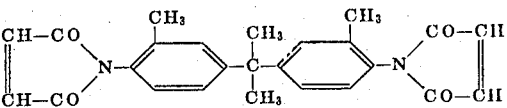

5. A bis-imide of the formula:

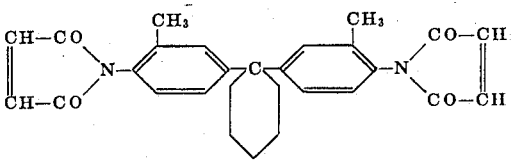

6. A bis-imide of the formula:

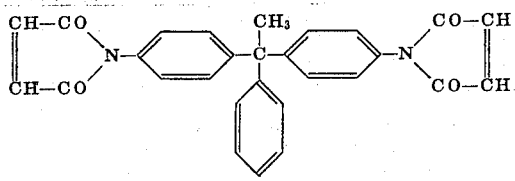

7. A bis-imide of the formula: